July 11, 1961

A. LANG 2,991,765

INTERNAL COMBUSTION RAMMING ARRANGEMENTS

Filed Oct. 3, 1960

Inventor
A. Lang
By Glascock Downing Seebold
Attys.

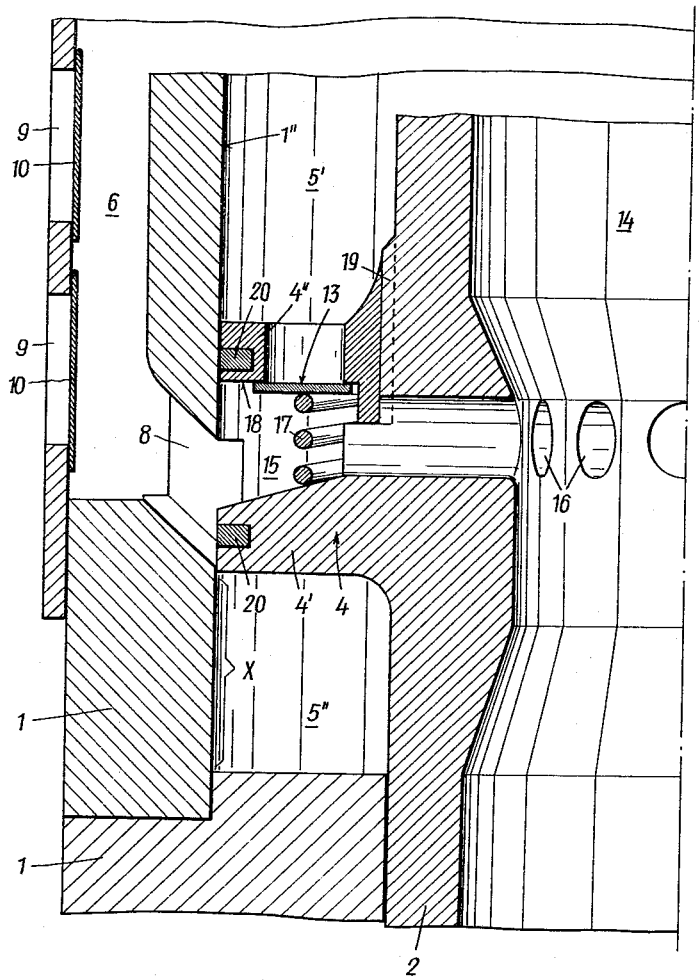

United States Patent Office 2,991,765
Patented July 11, 1961

2,991,765
INTERNAL COMBUSTION RAMMING ARRANGEMENTS
Anton Lang, Hartberg, Styria, Austria, assignor to Delmag-Maschinenfabrik Reinhold Dornfeld, Esslingen (Neckar), Germany
Filed Oct. 3, 1960, Ser. No. 59,990
Claims priority, application Austria Oct. 14, 1959
3 Claims. (Cl. 123—7)

The invention relates to a scavenging pump for pile drivers working on the principle of a diesel engine, and comprising a piston guided in the body of the rammer forming together with the same a combustion chamber, whereby the rammer is lifted, said piston having a wider portion forming a shoulder which slides in a recess in the body of the rammer, forming a seal therewith, and from the lower part of which there is branched off a bypass or transfer passage, leading to the combustion chamber.

With hitherto known constructions of this kind, only that air may be supplied to the combustion chamber as scavenging and charging medium which is present at the time in the annular space of the recess of the rammer body below the piston shoulder. Compared with ordinary internal combustion engines, therefore, the supply of scavenging air is considerably reduced, since not the entire surface of the piston is active as air suction or air transporting surface, but only the annular face formed by the piston shoulder. The result of this insufficient supply of scavenging air is inefficient combustion with sooty exhaust, causing many operational failures, particularly if the rammer is used as pile driver in comparatively soft and resilient soil or as tamper.

The present invention has the object of supplying rammers of the type described above with considerably larger quantities of scavenging air per charge, and that by using the simplest possible means, using mainly already available parts of the structure in order to produce this effect. According to this invention, this is achieved especially in that the part of the rammer recess, located above the shoulder of the piston, may be connected to the outer air by a relief pressure valve opening into this space, and by a second relief pressure valve, allowing the flow out of this space, with a storage space or chamber, provided inside the piston, which chamber connects at the end of the combustion stroke with the by-pass branching off the lower part of the rammer recess, so that the air compressed in the storage space during the compression stroke, causes additional scavenging at the end of the following combustion stroke. By means of this construction, the piston shoulder is rendered double-acting, enabling the air present in the rammer body above the piston shoulder to be used for scavenging and charging, in that it is transferred to the combustion chamber after the air supplied from the below the piston shoulder, and continues the scavenging in this manner. The design according to this invention also presents advantages, because it makes possible the utilization of that part of the rammer body recess located above the piston shoulder and eliminates the dead space in hitherto known constructions, which has an adverse effect on the action of the pump.

It has been known with two-stroke internal combustion engines to suck in air into an additional scavenging pump cylinder by means of a stepped piston during a part of the compression stroke and the following combustion stroke of the working piston, and to force the air then, towards the end of the combustion stroke, through a scavenging air receptor into the combustion chamber. Thus, the scavenging air receptor is not charged during the compression stroke of the piston, but receive air from the scavenging pump housing only during the last part of the combustion stroke and transfers it during the same stroke into the combustion chamber. The scavenging air receptor does not, therefore, serve as compressor for additional scavenging air during the entire compression stroke, in order to store this air until the termination of the following combustion stroke, and to supply it subsequently to the scavenging air supplied into the combustion chamber by the other face of the piston, which cannot be the case with known constructions, because here the entire scavenging air supplied is delivered by the scavenging air receptor and by no other means. The reason for this is that the scavenging air piston is, in these hitherto known designs, not stepped in order to render it double-acting for the supply of scavenging air. The part of the piston adjacent to the expanded shoulder serves to supply the combustion chamber of the working cylinder with fuel-air mixture.

It is also known with internal combustion engines to supply the gas-air mixture through a hollow piston, but also this does not form a storage space in which air is compressed during the compression stroke in order to be used at the end of the following combustion stroke as additional scavenging air, and these hitherto known constructions do not provide for additional scavenging. The hollow piston forms only part of the suction intake for the fuel-air mixture.

In a further embodiment of the invention, the relief pressure valve located above the piston shoulder and opening away from the rammer body recess, may be located in the piston shoulder and be connected to the storage space within the piston through an annular space in the piston shoulder and leading into the interior of the piston, preferably by means of radial bores. The annular space in the piston shoulder may extend to the wall of the recess in the rammer body which closes it laterally, and communicate with the by-pass only at the end of the combustion stroke.

The invention will be further described, by way of example, with reference to the accompanying drawing, showing one embodiment thereof, and in which:

FIG. 3 shows part of the equipment on an enlarged scale.

Figure 1:
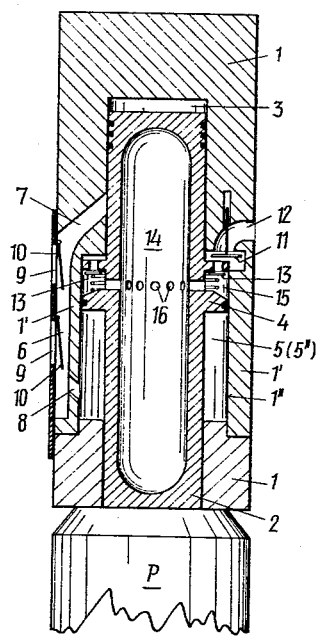
FIG. 1 is an elevational cross-section of the scavenging pump with the rammer just impacting on the pile.

Referring to the drawing, the body of the rammer 1 holds the piston 2, which is lifted and guided therein. Rammer and piston form together the combustion chamber 3. The piston has a shouldered flange 4 which is slidably movable in the recess 5 of the rammer body and forms a seal therewith. The recess 5 is laterally defined by the scavenging cylinder 1' which forms a part of the rammer body. From the lower part of the rammer recess 5 there is branched off the by-pass or transfer duct 8 leading through the lateral space 6 and the scavenging slot 7 to the combustion chamber 3. The space 6, through which is provided not only the supply of the air to the combustion chamber, but also the intake of a part of the scavenging air, communicates with the outer air through intakes 9 which cooperate with flaps 10 which may be closed towards the outside.

The portion 5' located at any time above the flange-like shoulder 4, and forming part of the rammer body recess (FIG. 2) is connected to the outer air by means of a relief pressure valve 11, which opens towards the inside, and of which several may be provided. The suction intake leading to said valve is shown at 12. The space 5' is connected with the storage space 14 by means of a further relief pressure valve opening away from the former and marked at 13; said storage space is provided inside the piston 2 and communicates with the by-pass 8 branching off the lower part of the rammer body recess at the end of the combustion stroke (FIG. 2). The relief pressure valve 13 is arranged in the piston shoulder 4. It communicates with the storage space 14 inside the piston through an annular space 15 provided in the piston shoulder 4 and through radial passages 16 leading from there into the interior of the piston. The annular space 15 extends up to the wall 1" of the rammer body recess 5 which defines its lateral boundary (FIG. 1), and communicates with the by-pass 8 only at the end of the combustion stroke (FIG. 2).

The relief pressure valve 13 arranged in the shoulder of the piston 4 has the shape of an annular valve. Its helical spring 17 surrounding the piston 2 abuts against the lower part 4' of the piston shoulder 4 (FIG. 3). The valve seat 18 is provided on an annular body forming the upper part 4" of the piston shoulder, and screwably connectable to said piston 2 in the direction of the axis of the latter by a thread 19. In order to seal the annular space 15 of the piston shoulder 4 against the recess in the rammer body 5, the upper portion 4" and the lower portion 4' of the piston shoulder have each one sealing ring 20, cooperating with the wall 1" of the rammer body recess 5. The upper edge of the exhaust port, shown at 21 (FIG. 2) is located slightly higher than that of the scavenging port 7, as is usual in such constructions.

Figure 2:
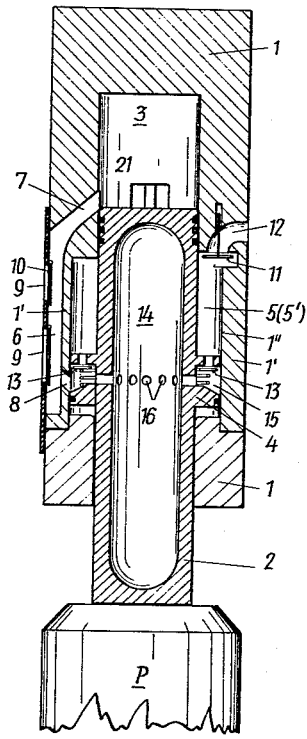
FIG. 2 is a section, corresponding to that of FIG. 1, but with the rammer lifted off the pile.

The operation is as follows:

As shown in FIG. 1, the rammer body 1 has impacted upon the pile P to be driven into the soil, scavenging air having been compressed into the storage space 14 of piston 2, as will be described later. Due to the combustion of the fuel-air mixture compressed in the combustion chamber 3, the body of the rammer 1 is lifted, supporting itself against the pile P by means of piston 2. The means for introducing the fuel into the combustion chamber have been omitted in the drawing. The relative movement between rammer body 1 and piston 2 occurring during the upward movement causes the piston shoulder to move away from the relief pressure valve 11, which opens, due to the vacuum created in the upper part of the rammer body recess and admits air thereinto through the suction intake 12. At the same time, the air on the other side of the double-acting piston shoulder 4, that is, in the recess 5" and also in the by-pass 8 and in the space 6 is compressed until the scavenging slot 7 is freed by the piston at the end of the combustion stroke, at which instant the compressed scavenging air flows into the combustion chamber 3. With the further upward movement of the rammer body relative to the piston 2 resting on the pile P, the annular space 15 of the piston shoulder 4 communicates immediately wth the transfer channel 8 (FIG. 2). Thus, immediately after the air coming from the part 5" of the recess, also the air compressed in the part 5' and in the storage space 14 flows through the by-pass 8, space 6 and the scavenging slot 7 into the combustion chamber. Thus, not only the air present under the piston shoulder 4, but also the air above the same within the rammer body recess 5 is blown into the combustion chamber 3 at the end of one and the same combustion stroke. The air drawn into the upper part of the recess 5' through the suction pipe 12 is compressed in the manner described above already during the preceding compression of the fuel-air mixture, since during this stroke the piston shoulder 4 approaches the relief pressure valve 11, closing the same and causing the air drawn into the chamber 5' to be compressed. The pressure increase caused thereby in the part 5' causes the annular relief pressure valve 13 in the piston shoulder to open, so that the air is pressed through the laterally closed annular space 15 in the piston shoulder and the passages 16 into the storage space 14. Thus, for every scavenging stroke also the air stored within the piston is available and is pressed into the combustion chamber immediately following the air from the lower space 5''', resulting in excellent scavenging and charging and in effective operation of the rammer even in resilient soil and enabling the appliance also to be used as tamper. In comparison with hitherto known constructions the amount of air available for scavenging is more than doubled, because, as may be seen from the drawing, the pumping which may be effected in the portion 5' above the piston shoulder in the rammer body recess 5 is substantially greater than that which may be carried out in the lower portion 5" since with identically dimensioned effective upper and lower annular surfaces of the piston shoulder, the upper annular face cooperates in the space 5' with a greater effective suction and compression stroke.

The flaps 10 cooperating with the suction inlets 9 are closed during the combustion stroke, whilst the relief pressure valve 11 allows the additional scavenging air to be used during the next combustion stroke to enter into the rammer body.

The rammer body 1 lifted by the combustion pressure takes along, during its upward movement beyond the position of FIG. 2 also the piston 2. As may be seen from FIG. 3, there is formed after the transfer through the by-pass 8 below the lower part 4' of the piston shoulder an air cushion X, which accelerates the piston 2, resting on the pile P until it reaches, first, the same velocity as the rammer 1. During the expansion of the air cushion compressed during the movement of the piston carrier, the upward movement of the rammer body is further retarded, whilst the piston is thrown upwards acceleratedly, in such a way that its speed relative to that of the rammer body 1 corresponds to the speed of the rammer body at the moment at which is exerted through the air cushion X on the piston 2 the resilient shock triggering its upward movement. In order to guarantee the good efficiency of the additional scavenging, the passages of the relief pressure valve 13 and the storage chamber 14 must be amply dimensioned, which can be easily solved from the structural point of view. The large flow area of the relief pressure valve 13 is already safeguarded by its design as annular valve surrounding the piston. The piston itself provides sufficient space for the storage chamber.

I claim:

1. A ramming arrangement comprising a rammer and a piston guided in the body of the rammer, the rammer having a first recess forming with the piston a combustion chamber for operating the rammer, a second recess, a first passage from the first recess to one end of the second recess, a second passage from outside air to the end of the second recess and a pressure relief valve opening inwardly in said second passage and the piston having a hollow chamber inside, a shoulder sliding in sealing connection in the second recess, a third passage for the hollow chamber communicating with the first passage at the end of the combustion stroke, a fourth passage from the second recess to the hollow chamber on the same side of the shoulder as the second passage and a second pressure relief valve opening inwardly in the fourth passage.

2. A ramming arrangement as claimed in claim 1 in which the fourth passage leads from the second recess to an annular recess in the shoulder communicating with the hollow chamber to the third passage.

3. A ramming arrangement as claimed in claim 2 in which the second pressure relief valve is an annular valve and is spring loaded by a helical spring surrounding the piston within the annular recess.

No references cited.